United States Patent [19]
Tischler et al.

[11] Patent Number: 5,768,263
[45] Date of Patent: Jun. 16, 1998

[54] METHOD FOR TALK/LISTEN DETERMINATION AND MULTIPOINT CONFERENCING SYSTEM USING SUCH METHOD

[75] Inventors: Paul V. Tischler; Bill Clements, both of Austin, Tex.

[73] Assignee: VTEL Corporation, Austin, Tex.

[21] Appl. No.: 546,276

[22] Filed: Oct. 20, 1995

[51] Int. Cl.[6] ............................................. H04L 12/16
[52] U.S. Cl. ............................................. 370/263; 379/202
[58] Field of Search ............................. 370/260, 263, 370/264, 266, 270, 465; 379/157, 158, 202

[56] References Cited

U.S. PATENT DOCUMENTS

| | | | |
|---|---|---|---|
| 4,648,108 | 3/1987 | Ellis et al. | 379/202 |
| 4,937,856 | 6/1990 | Natarajan | 379/158 |
| 5,555,017 | 9/1996 | Landante et al. | 348/15 |
| 5,563,952 | 10/1996 | Mercer | 381/56 |

*Primary Examiner*—Hassan Kizou
*Assistant Examiner*—A. Bnimoussa
*Attorney, Agent, or Firm*—Baker & Botts, L.L.P.

[57] ABSTRACT

A method for determining a talk/listen state using a dynamic threshold is provided that can be implemented in a multipoint control unit (12). An audio sample is received and represents sound measured during a sample time interval. An audio level is generated from the audio sample. The audio level represents an average power level of the audio sample. A dynamic threshold is set by processing the audio level. The audio level is compared to the dynamic threshold. A talk/listen state is determined to be a talking state if the audio level is above the dynamic threshold and to be a listening state if the audio level is below the dynamic threshold. The previous steps are repeated for each audio sample in a sequential stream of received audio samples such that the dynamic threshold is maintained and used to determine the talk/listen state.

37 Claims, 4 Drawing Sheets

METHOD FOR TALK/LISTEN DETERMINATION AND MULTIPOINT CONFERENCING SYSTEM USING SUCH METHOD

TECHNICAL FIELD OF THE INVENTION

This invention relates in general to the field of multipoint conferencing systems, and more particularly to a method for talk/listen determination and a multipoint conferencing system using such method.

BACKGROUND OF THE INVENTION

A multipoint control unit (MCU) can be used to process audio, video and data information communicated between conference sites in a multipoint conference. With respect to the audio signals, an MCU can analyze audio signals received from conference equipment in the conference sites to determine whether the sites are in a talking or listening state. When the MCU determines that there is a unique talking site, or talker, that site can become the video source for the remaining conference sites. Switching video in this way is referred to as voice activated video switching.

The audio signals received by an MCU can vary greatly in volume and ambient noise (background noise) depending on, for example, the conference room, conference equipment and audio compression algorithms used. These variations in speaker volume and ambient noise make the talk/listen determination difficult and adversely affect the MCU's ability to perform voice activated video switching between conference sites.

One conventional solution to the problem of determining whether a conference site is in a talking state or listening state is to use a fixed threshold level. Any audio level from the conference site above this threshold level is considered to be talking, while any audio level below the threshold level is considered listening. This solution suffers from a number of problems, in part, due to variations in ambient noise and talker volumes which give incorrect talk/listen indications. For example, where the ambient noise is higher than the fixed threshold, the conference site would always be identified as talking. Similarly, a site with a talker level lower than the fixed threshold would always be identified as listening.

A second conventional solution to the talk/listen determination of a conference site is the use of the difference between the received audio level and the transmitted audio level for the conference site. With this solution, a conference site is identified as talking when the transmitted audio level is higher than the received audio level. The site is identified as listening when the converse is the case. This solution also suffers from problems. For example, where one conference site has an ambient noise level higher than a speaker in the other conference site, an incorrect determination would occur. This solution also does not work between different conference equipment vendors where the same physical audio levels may be represented differently by audio signals from the different equipment.

It is desirable for an MCU to analyze audio signals received from an attached conference site to determine from the audio signals whether the site is talking or listening. It is also desirable to accomplish this talk/listen determination independent of the specific conference equipment used at the conference site.

SUMMARY OF THE INVENTION

In accordance with the present invention a method for talk/listen determination and a multipoint conference system using such method are provided that substantially eliminate or reduce disadvantages and problems associated with previously developed multipoint conferencing systems.

According to one embodiment of the present invention, a method for determining a talk/listen state using a dynamic threshold is provided. An audio sample is received and represents sound measured during a sample time interval. An audio level is generated from the audio sample. The audio level represents an average power level of the audio sample. A dynamic threshold is set by processing the audio level. The audio level is compared to the dynamic threshold. A talk/listen state is determined to be a talking state if the audio level is above the dynamic threshold and to be a listening state if the audio level is below the dynamic threshold. The previous steps are repeated for each audio sample in a sequential stream of received audio samples such that the dynamic threshold is maintained and used to determine the talk/listen state.

According to another embodiment of the present invention, a multipoint control unit is provided. The multipoint control unit includes a plurality of conference units. Each conference unit is operable to receive and process each audio sample in a sequential stream of audio samples received from an associated conference site. Each conference unit is further operable to maintain a dynamic threshold, to compare an audio level of each audio sample to the dynamic threshold and to provide a notification signal indicating a talk/listen state of the associated conference site. A control unit is coupled to the plurality of conference units and receives each notification signal. The control unit is operable to control voice activated switching of video between the associated conference sites using the notification signals.

A technical advantage of the present invention is the determination and use of a dynamic threshold with respect to each conference site based on audio signals received from that site for use in determining whether the site is talking or listening. This is especially advantageous in the cascade case where the received audio signal is a mix of multiple conference sites received from an MCU and includes noise from the associated conference sites.

Another technical advantage of the present invention is the determination of three dynamic levels from which a dynamic threshold is calculated. The MCU determines, for each site, an average audio power level for each audio data packet received. The audio levels are used to update and maintain three dynamic levels: background, long term background, and foreground. The dynamic threshold is then calculated as a weighted sum of the foreground level, background level and long term background level.

A further technical advantage of the present invention is allowing an MCU to accurately determine whether a site is talking or listening independent of the conference equipment or audio compression algorithm used. Thus, the present invention makes the MCU's determination of the talk/listen state independent of the manufacturer of the conference equipment.

An additional technical advantage of the present invention is the recording of value histories for the dynamic threshold and audio levels. This history can be accessed either locally or remotely and used to diagnose user problems with the multipoint conference system.

Another technical advantage of the present invention is the ability of a multipoint control unit to accurately determine whether a site is talking or listening despite differences in talker volume, ambient noise, attached site conference equipment or audio compression algorithms. Correct talk/listen determination enables the MCU to perform activated video switching cleanly and accurately.

BRIEF DESCRIPTION OF THE DRAWINGS

A more complete understanding of the present invention and advantages thereof may be acquired by referring to the following description taken in conjunction with the accompanying drawings in which like reference numbers indicate like features, and wherein.

DETAILED DESCRIPTION OF THE INVENTION

Figure 1:
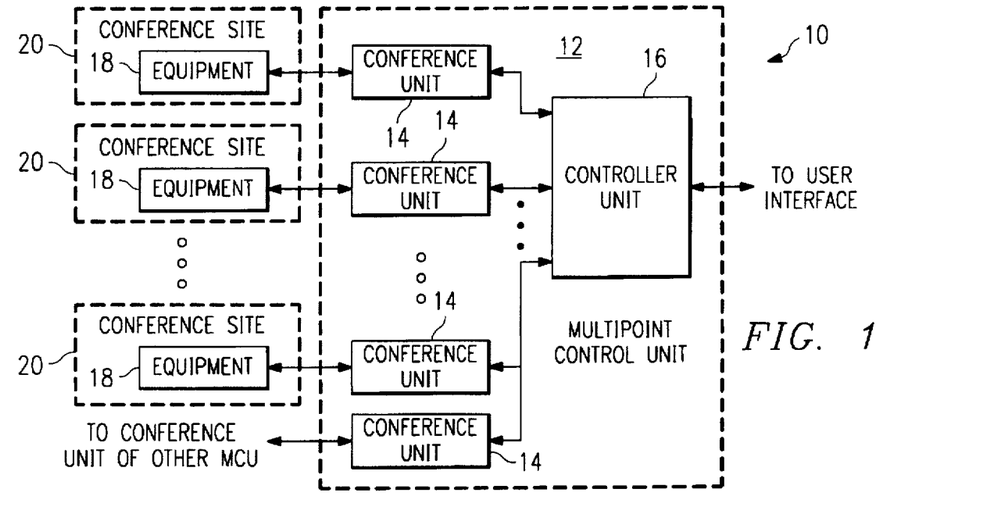
FIG. 1 is a block diagram of one embodiment of a multipoint conference system constructed according to the teachings of the present invention.

FIG. 1 is a block diagram of one embodiment of a multipoint conference system, indicated generally at 10. System 10 includes a multipoint control unit 12 that comprises a plurality of conference units 14 coupled to a controller unit 16. Controller unit 16 can also be coupled to other controller units via a conference unit 14 as shown. Controller unit 16 can also communicate with a user through a user interface. Each conference unit 14 is coupled to one of a plurality of sets of conference equipment 18 located at a plurality of conference sites 20. Each set of conference equipment 18 comprises input/output devices for audio, video and data information transmission and reception.

In operation, system 10 provides a multipoint conference environment for users located at each conference site 20. Each equipment 18 located at a conference site 20 communicates audio, video and data information to users at conference site 20. Each equipment 18 is coupled to a conference unit 14 in order to communicate the audio, video and data information to other conference sites 20. Each conference unit 14 operates to receive information from and transfer information to associated equipment 18 and to other conference units 14. Each conference unit 14 also operates to interface with controller unit 16.

Controller unit 16 operates to control the multipoint conference environment including switching video, audio and data information between the conference units 14 to create and maintain a multipoint conference between conference sites 20. One of the functions that can be performed by controller unit 16 is voice activated video switching between conference sites 20. According to the teachings of the present invention, each conference unit 14 notifies controller unit 16 as to whether the associated conference site 20 is in a talking state or listening state. Controller unit 16 then uses this talk/listen determination in order to switch video between conference sites 20.

Figure 2:
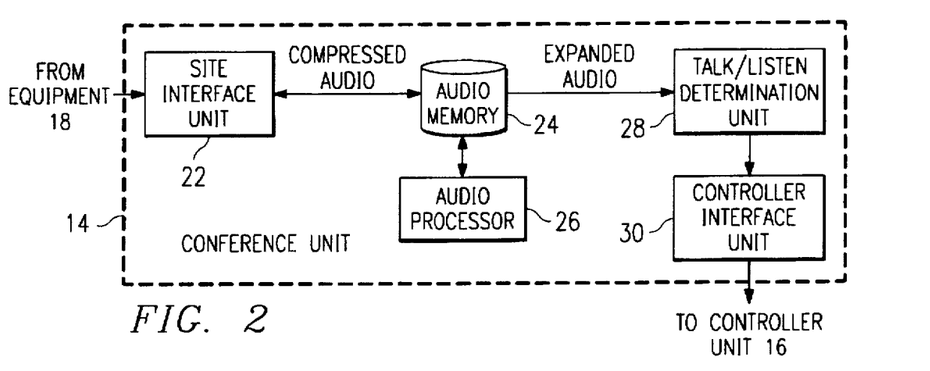
FIG. 2 is a block diagram of one embodiment of a conference unit in the multipoint conference system of FIG. 1 constructed according to the teachings of the present invention.

FIG. 2 is a block diagram of one embodiment of a conference unit 14 of multipoint control unit 12 of FIG. 1. Conference unit 14 comprises a site interface unit 22 which communicates with equipment 18 by receiving and transmitting the audio, video and data information. With respect to audio information, site interface unit 22 provides compressed audio samples to an audio memory 24. In one embodiment of the present invention, the compressed audio samples comprise packets of audio data representing 20 milliseconds of sound measured from the conference site. The audio samples can be compressed according to conventional data compression algorithms.

Audio memory 24 stores the compressed audio samples received from equipment 18 as well as compressed audio samples to be accessed by site interface unit 22 for transmission to equipment 18. Audio memory 24 can comprise a memory device, a magnetic storage device, or other electronic or magnetic storage device. Audio processor 26 is coupled to audio memory 24 and accesses both compressed and expanded audio samples.

A talk/listen determination unit 28 is coupled to audio memory 24 and receives expanded audio samples from audio memory 24. Talk/listen determination unit 28 processes the expanded audio samples and provides a talk/listen notification signal to a controller interface 30. The talk/listen notification signal indicates whether the associated conference site 20 is in a talk state or listen state. Controller interface 30 is coupled to controller unit 16 and provides controller unit 16 with talk/listen notification.

In operation, conference unit 14 receives audio, video and data information from and transmits such information to equipment 18 located in an associated conference site 20. With respect to received audio samples, site interface unit 22 stores the compressed audio samples in audio memory 24. Site interface unit 22 also operates to transmit compressed audio samples to equipment 18 for presentation to users at conference site 20. Once stored in audio memory 24, the compressed audio samples are accessed by audio processor 26. Audio processor 26 expands the audio sample according to an appropriate data compression algorithm that matches the algorithm used by equipment 18. After expansion, the audio samples are stored in audio memory 24.

Talk/listen determination unit 28 accesses the expanded audio samples and processes those samples to determine whether the associated conference site 20 is talking or listening. The talk/listen determination unit 28 uses the audio samples to calculate and maintain a dynamic threshold to which to compare each audio sample. An audio sample above the dynamic threshold indicates a talking state and an audio sample below the dynamic threshold indicates a listening state. The talk/listen determination unit 28 then generates and provides a talk/listen notification signal which is provided to control unit 16. The dynamic threshold is based upon the audio samples received from equipment 18, thus the dynamic threshold automatically adapts to the specific characteristics of conference site 20.

In one embodiment of the present invention, talk/listen determination unit 28 processes audio data packets representing sound information measured from conference site 20 during an approximately twenty millisecond time period. Each compressed audio data packet corresponds to approximately twenty milliseconds and is processed within that time frame. According to the teachings of the present invention, talk/listen determination uses a dynamic threshold determined and maintained based upon the expanded audio data packets to determine whether conference site 20 is talking or listening.

In one embodiment of the present invention, multipoint control unit 12 is operable to use the dynamic threshold for talk/listen determination for each approximately twenty millisecond time period. In this embodiment, talk/listen determination unit 28 uses an average audio power level for each audio data packet to maintain dynamic audio levels from which the dynamic threshold is determined. In this embodiment, talk/listen determination unit 28 maintains audio levels comprising a foreground level, background level, and long term background level.

Figure 3:
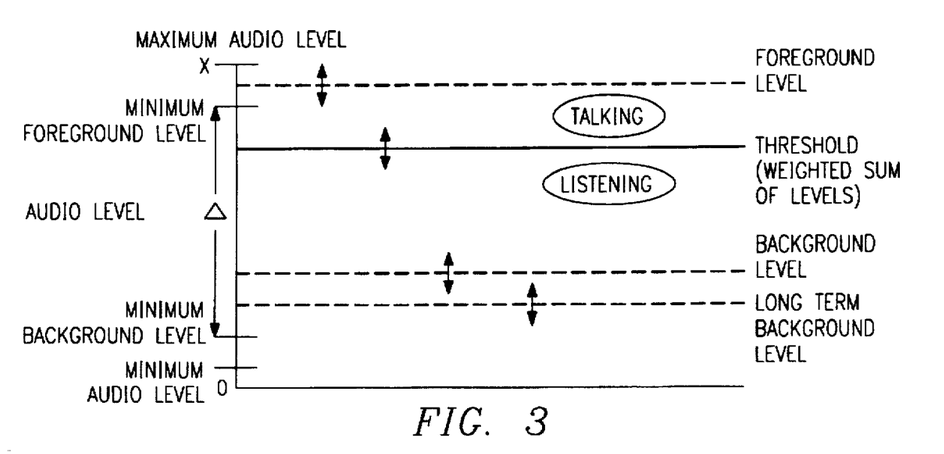
FIG. 3 illustrates one embodiment of a dynamic threshold and dynamic audio levels according to the teachings of the present invention.

A technical advantage of the present invention is the determination and use of a dynamic threshold with respect to each conference site based on audio signals received from that site for use in determining whether the site is talking or listening. This is especially advantageous in the cascade case where the received audio signal is a mix of multiple conference sites received from an MCU and includes noise from the associated conference sites FIG. 3 illustrates one embodiment of the dynamic threshold and dynamic audio levels maintained according to the teachings of the present invention. As described above, an audio level representing the average power level of each audio sample is determined. As shown in FIG. 3, the audio level of an audio sample can vary from zero to a maximum audio level X. This range can be implemented as desired. It can be desirable to implement the range such that fixed point integer operations can be used to process the values.

From the audio level, three running audio levels are maintained: foreground level, background level, and long term background level. The foreground level represents a running average of the audio power level of the conference site while the conference site is talking. The background level represents a running average of the audio level of the conference site while the conference site is listening. Third, the long term background level represents a running average of the background level.

The dynamic threshold is a dynamic weighted sum of the foreground level, background level and long term background level. The dynamic threshold represents the point defining the boundary between a talking state and a listening state. An audio level above the dynamic threshold indicates that the conference site is talking, and an audio level below the dynamic threshold indicates that the conference site is listening. All four levels are dynamic and change as each audio sample is processed.

In the illustrated embodiment, minimum levels are defined to insure that the levels fall within reasonable values. A minimum audio level is defined below which an audio level is ignored It is assumed that an audio sample having an average power level below this level is an anomaly and should not affect the dynamic levels. A minimum background level is defined below which the background level is not allowed to drop. Third, a minimum foreground level is defined in relation to the minimum background level such that a defined delta, $\Delta$, is maintained between the foreground level and the greater of the background level and the long term background level.

A technical advantage of the present invention is the determination of three dynamic levels from which a dynamic threshold is calculated. The MCU determines, for each site, an average audio power level for each audio data packet received The audio levels are used to update and maintain three dynamic levels: background, long term background, and foreground. The dynamic threshold is then calculated as a weighted sum of the foreground level, background level and long term background level.

An additional technical advantage of the present invention is the recording of value histories for the dynamic threshold and audio levels. This history can be accessed either locally or remotely and used to diagnose user problems with the multipoint conference system.

Figure 4A:
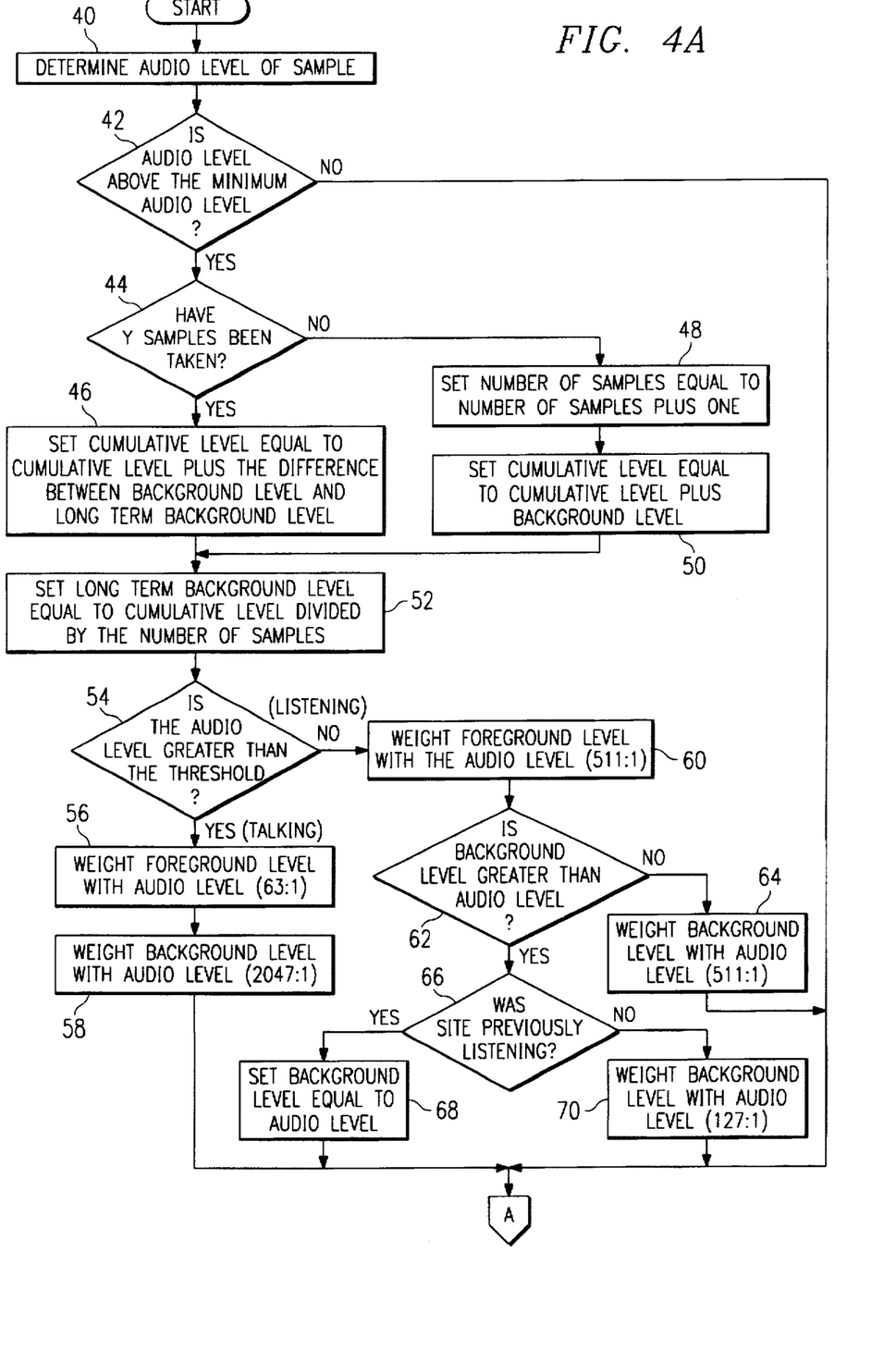
FIGS. 4A, 4B and 4C illustrate a flow chart of one embodiment of a method for talk/listen determination using a dynamic threshold according to the teachings of the present invention.
Figure 4B:
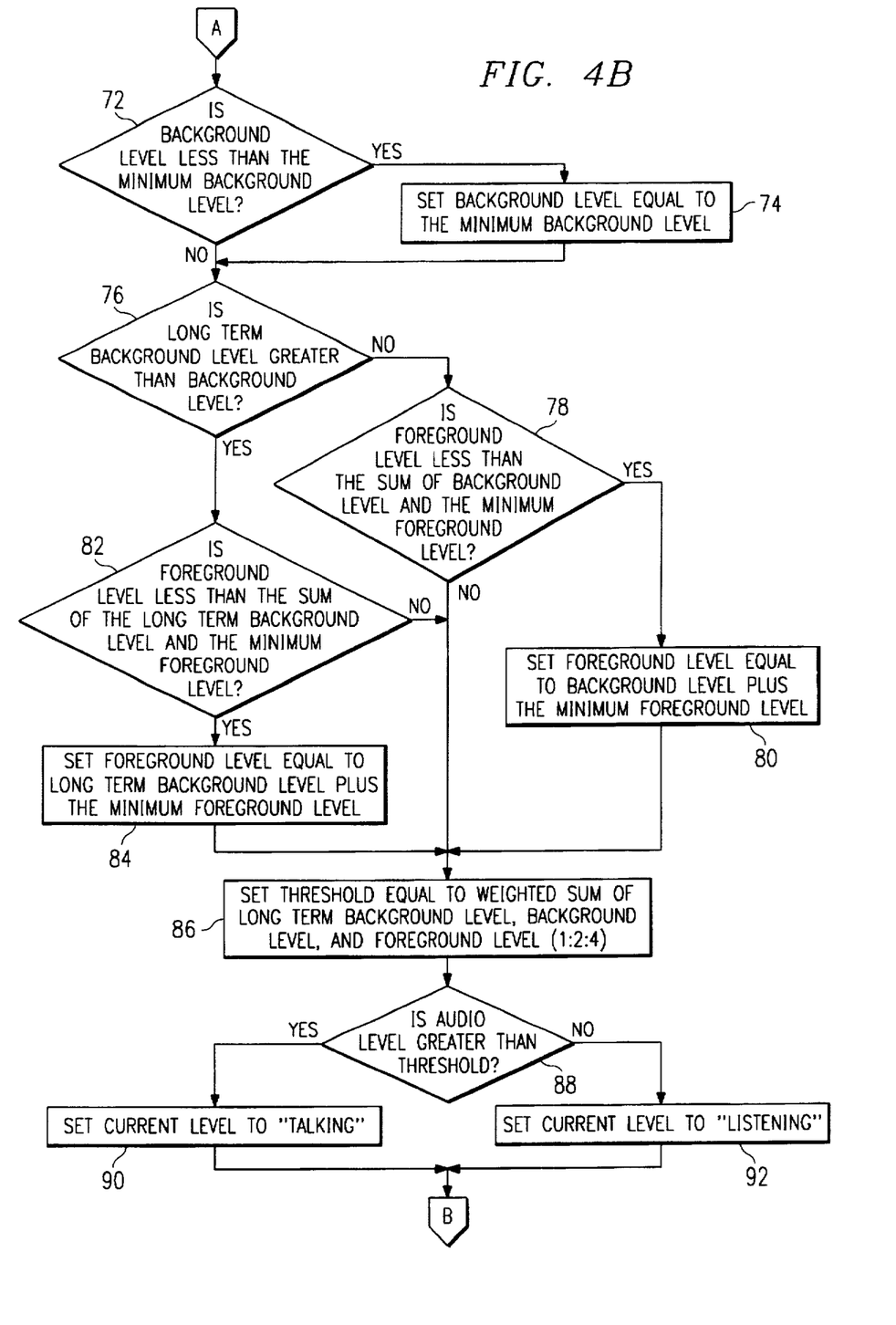
Figure 4C:
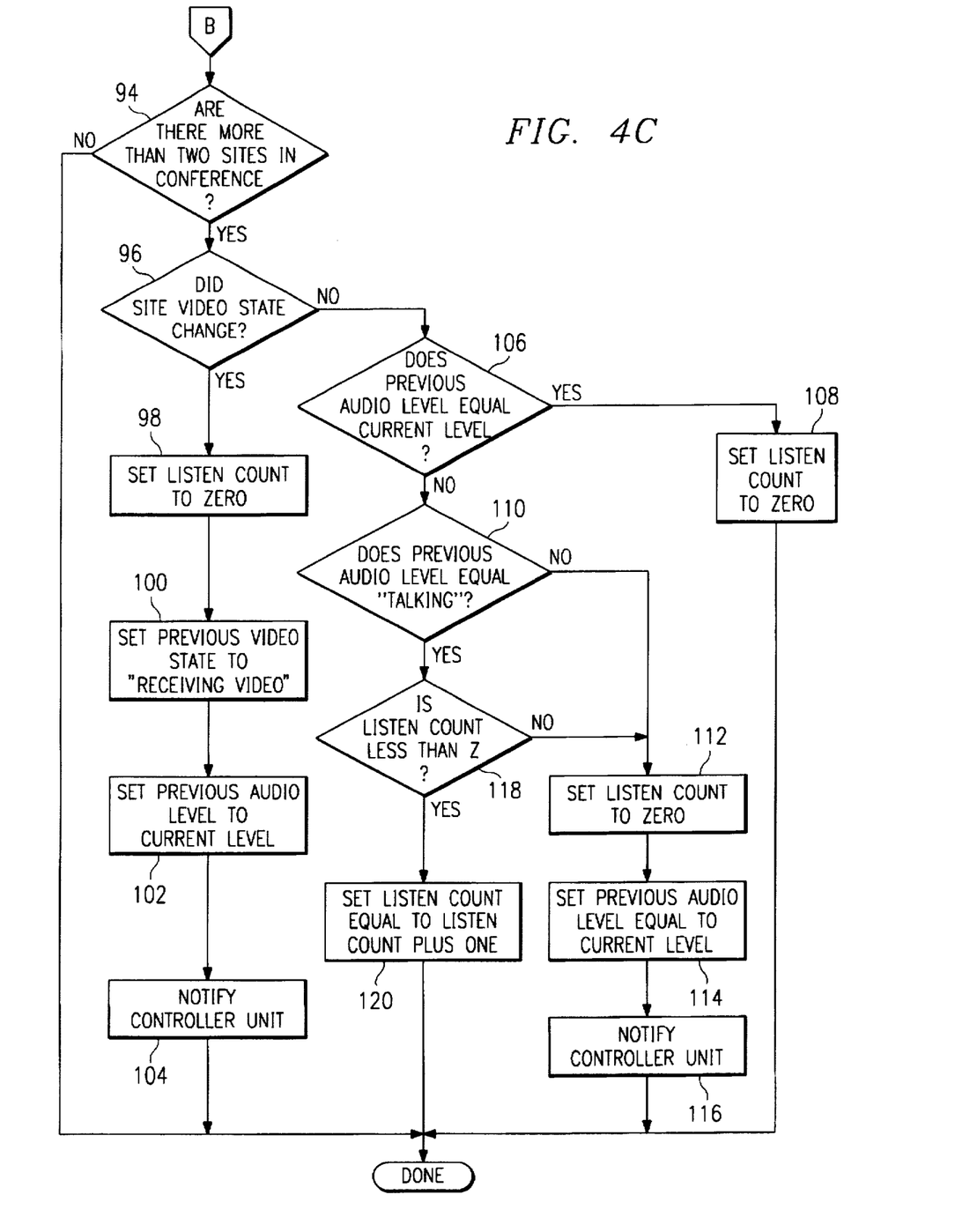

FIGS. 4A, 4B and 4C illustrate a flow chart of one embodiment of a method for talk/listen determination using a dynamic threshold according to the teachings of the present invention. It should be understood that the method illustrated in FIGS. 4A, 4B and 4C is performed for each audio sample.

In step 40 of FIG. 4A, the audio level of the audio sample is determined. This audio level comprises an average power level for each given audio sample. In one embodiment of the present invention, each audio sample is an expanded audio data packet representing the sound measured for approximately twenty milliseconds in the conference site. The audio level represents the average power level for the audio sample over a fixed interval of time. In one embodiment of the present invention, the audio level is represented as a value between zero and 255 which is then multiplied by 64 to allow fixed point operations.

In step 42, the audio level is compared against the minimum audio level. In one embodiment of the present invention, the minimum audio level has a value of two on the zero to 255 scale. If the audio level is not above the minimum audio level, the method continues at label "A" in FIG. 4B.

If the audio level is above the minimum audio level, the number of audio samples processed is checked in step 44. If a given number of audio samples, Y, have been processed, the method continues at step 46. Otherwise, the method continues at step 48. In one embodiment of the present invention, the number Y is set to 8192. In this embodiment, each audio sample represents approximately twenty milliseconds, thus the 8192 samples represent approximately 2.75 minutes. In step 46, the cumulative level is set equal to the value of the cumulative level plus the difference between the background level and the long term background level. If Y audio samples have not been taken, the number of samples is set equal to the number of samples plus one in step 48. Then, in step 50, the cumulative level is set equal to the cumulative level plus the background level. In this way, prior to the processing of Y audio samples, the cumulative level holds the sum of the background levels determined by processing each audio sample. After Y audio samples have been processed, the cumulative level represents a running total of the background levels. In step 52, the long term background level is set equal to the cumulative level divided by the number of samples.

In step 54 of FIG. 4A, the audio level is compared to the dynamic threshold. If the audio level is greater than the dynamic threshold, then the conference site is assumed to be talking. If not, the conference site is assumed to be listening. If the audio level is greater than the dynamic threshold, the foreground level is weighted with the audio level in step 56. In the illustrated embodiment of the present invention, this weighting is at a ratio of 63:1. As used herein, weighting at a ratio of 63:1 means the following:

(((Foreground level)×63)+((audio level)×1))/64.

In step 58, the background level is then weighted with the audio level. In the illustrated embodiment of the present invention, the background level is weighted with the audio level at a ratio of 2047:1.

If the audio level is not greater than the dynamic threshold in step 54, the foreground level is weighted with the audio level at a lesser weight in step 60. In the illustrated embodiment, the foreground level is weighted with the audio level at a ratio of 511:1. The background level, in step 62, is then compared to the audio level. If the background level is not greater than the audio level, the background level is weighted with the audio level in step 64. In the illustrated embodiment, the background level is weighted with the audio level at a ratio of 511:1. The method then continues at label "A" in FIG. 4B.

If the background level is greater than the audio level in step 62, the previous state of the conference site is checked in step 66. If the site was previously listening, then, in the illustrated embodiment, the background level is set equal to the audio level in step 68. This is essentially a complete weighting of the background level with the audio level. If the site was not previously listening, the background level is weighted with the audio level in step 70. This ratio is less than that in step 64. In the illustrated embodiment, the background level is weighted with the audio level at a ratio of 127:1. After step 70 or step 68, the method continues at label "A" in FIG. 4B.

FIG. 4B illustrates a second part of the flow chart of the method for talk/listen determination. Continuing from label "A", the background level is compared to the minimum background level in step 72. If the background level is less than the minimum background level, the background level is set equal to the minimum background level in step 74. This is done to insure that the background level does not drop below a minimum desired background level. In the illustrated embodiment, the minimum background level is set to six on the scale from zero to 255.

In step 76, the long term background level is compared to the background level. If the long term background level is not greater than the background level, the foreground level is then compared to the sum of the background level and the minimum foreground level in step 78. The minimum foreground level defines a desired delta between the foreground level and the higher of the background level and the long term background level. In one embodiment of the present invention, the minimum foreground level is set to 52 on the scale from zero to 255.

If the foreground level is less than the sum of the long term background level and the minimum foreground level, the foreground level is set equal to the background level plus the minimum foreground level in step 80. This insures that the desired delta defined by the minimum foreground level is established between the foreground level and the background level. As mentioned above, the background level is used rather than the long term background level because the background level is higher. If, in step 78, the foreground level is not less than the sum of the long term background level and the minimum foreground level, then no adjustment is necessary.

In step 76, if the long term background level is greater than the background level, the foreground level is then compared to the long term background level plus the minimum foreground level in step 82. If the foreground level is less than that sum, in step 84, the foreground level is set equal to the long term background level plus the minimum foreground level. Again, this insures a desired delta between the foreground level and the long term background level. In this case, the long term background level is higher than the background level.

After step 78, 80, 82, or 84, respectively, the dynamic threshold is set equal to a weighted sum of the long term background level, background level and foreground level in step 86. In the illustrated embodiment, the dynamic threshold is weighted at the ratio 1:2:4 with respect to the long term background level, the background level, and the foreground level. Thus, the dynamic threshold equals the following:

(((Long term background level) × 1) +

(background level × 2) + ((foreground level) × 4))/7.

As should be understood, this threshold is dynamic and changes as each audio sample is processed. The background level, long term background level and foreground level also vary as the audio level of each sample is processed. As shown in the embodiment of FIG. 3, these levels vary within the range of the audio level, but can be fixed to some extent by defined minimum levels.

According to the teachings of the present invention, the dynamic threshold is used to determine whether a conference site is in the talking or listening state. In step 88, the audio level is compared to the dynamic threshold. If the audio level is greater than the dynamic threshold, then the current level is set to "talking" in step 90. If not, the current level is set to "listening" in step 92. In one embodiment of the present invention, talking is represented by "0×FFFF," and listening is represented by "0×0000." The method then continues at label "B" of FIG. 4C.

FIG. 4C illustrates a third part of the flow chart of the method for talk/listen determination. Continuing from label "B", the number of conference sites is checked in step 94. If there are not more than two sites presently in the conference, the method has completed processing of the current audio sample.

If there are more than two sites in the conference, the video state of the associated conference site is analyzed in step 96. If the video state of the site has changed, the listen count is set to zero in step 98. A change of video state is a change from only receiving video to receiving and transmitting video or vice versa. In step 100, the previous video state is set to "receiving video". Then, in step 102, the previous audio level is set to equal the current level. (It should be noted that the current level was set in either step 90 or step 92 of FIG. 4B.) The controller unit is then notified in step 104 as to the current level.

If the site video state did not chance, then the previous audio level is compared to the current level in step 106. If the previous audio level is equal to the current level, the listen count is set equal to zero in step 108. The previous audio level and current level are equal when the state of the conference site, talking or listening, has not changed due to the current audio sample.

In step 110, the previous audio level is checked to determine whether or not it is talking. If the previous audio level is not talking (i.e. listening), the listen count is set to zero in step 112. Then, in step 114, the previous audio level is set equal to the current level (which is talking). The controller is then notified of the current level in step 116.

If, in step 110, the previous audio level was talking, the listen count is compared to a number Z in step 18. Z can be set to a value as desired to provide a silence delay for speaker pauses. In one embodiment of the present invention, Z is set to the number 6. If the listen count is not less than Z, then the listen count is set to zero in step 112, the previous audio level is set equal to the current level (which is listening) in step 114, and the controller unit is notified of the current level in step 116. If the listen count is less than Z, the listen count is incremented by one in step 120.

It should be understood that the series of steps from 106 to 120 operate to make no notification to the control unit if the previous audio level and current level are the same. If the previous audio level and current level are different, separate processes are implemented depending upon whether the previous audio level was talking or listening. If the previous audio level was listening, the listen count is immediately set to zero, the previous audio level is set to equal the current level (which is talking), and the controller unit is notified. However, if the previous audio level was talking, a silence delay is implemented by step 118. When the previous audio level is talking, steps 112, 114 and 116 are executed only if the listen count is greater than Z. The listen count can grow greater than Z only when the previous audio level is talking and a number of audio samples equal to Z have indicated a current level of listening. Thus, the controller unit is notified of a change from talking to listening only after Z audio samples have indicated such a change.

In one embodiment of the present invention, the method for talk/listen determination of FIGS. 4A–4C is implemented by the source code listed in Appendix A.

According to the teachings of the present invention, the audio level of audio samples received from the conference site are used to determine and maintain a dynamic threshold. This dynamic threshold is then used to identify the conference site as talking or listening. The talker determination can then be supplied to a control unit or other appropriate switching device to implement voice activated switching in a multipoint conference.

A technical advantage of the present invention is allowing an MCU to accurately determine whether a site is talking or listening independent of the conference equipment or audio compression algorithm used. Thus, the present invention makes the MCU's determination of the talk/listen state independent of the manufacturer of the conference equipment.

Another technical advantage of the present invention is the ability of a multipoint control unit to accurately determine whether a site is talking or listening despite differences in talker volume, ambient noise, attached site conference equipment or audio compression algorithms. Correct talk/listen determination enables the MCU to perform activated video switching cleanly and accurately.

The technical advantages of the present invention apply to any system that operates to determine whether an audio data stream represents a talking state. For example, phone mail systems often determine whether a user is speaking when recording a message. Thus, in some such systems, the listen state described above would refer to a not-talking state not necessarily having a "listener." The embodiments described herein are not intended and should not be construed to limit the application of the present invention.

Although the present invention has been described in detail, it should be understood that various changes, substitutions and alterations can be made hereto without departing from the spirit and scope of the invention as defined by the appended claims.

APPENDIX A - SOURCE CODE

```
ALevelMeasurement = 0; /* Average energy of just this message */
ALevelMeasurement = MeasureAudioLevel (ALevelMeasurement,
       ASPMsg->Msg,
       ASPMsg->MsgHdrLen);
CurrentLevel = ALevelMeasurement;
if (CurrentLevel >= MIN_AUDIO_LEVEL) {
  if (CumSamples >= MAX_CUM_SAMPLES) {
    CumLevel += (BackGndLevel - LTBackGndLevel);
    LTBackGndLevel = CumLevel / MAX_CUM_SAMPLES;
  }
  else {
    CumSamples++;
    CumLevel += BackGndLevel;
    LTBackGndLevel = CumLevel / CumSamples;
  }
  if (CurrentLevel > ThresholdLevel) {
    /* Currently Level above Threshold, assume Talking */
    ForeGndLevel = ((ForeGndLevel * 63) + CurrentLevel) / 64;
    BackGndLevel = ((BackGndLevel * 2047) + CurrentLevel) / 2048;
  }
  else {
    /* Currently Level below Threshold assume Listening */
    ForeGndLevel = ((ForeGndLevel * 511) + CurrentLevel) / 512;
    if (BackGndLevel > CurrentLevel) {
      /* Currently Level below Background average, assume
         background */
      if (ListenCnt) {
        /* Currently talking, make BackGndLevel very reactive */
        BackGndLevel = CurrentLevel;
      }
      else {
        /* Currently listening, make BackGndLevel less reactive */
        BackGndLevel = ((BackGndLevel * 127) + CurrentLevel) / 128;
      }
    }
    else {
      /* Currently Level above Background average, make BackGndLevel
         even less reactive */
      BackGndLevel = ((BackGndLevel * 511) + CurrentLevel) / 512;
    }
  }
  if (BackGndLevel < MIN_BACKGND_LEVEL)
    BackGndLevel = MIN_BACKGND_LEVEL;
  if (LTBackGndLevel > BackGndLevel) {
    if (ForeGndLevel < LTBackGndLevel + MIN_FOREGND_LEVEL)
      ForeGndLevel = LTBackGndLevel + MIN_FOREGND_LEVEL;
  }
  else {
    if (ForeGndLevel < BackGndLevel + MIN_FOREGND_LEVEL)
      ForeGndLevel = BackGndLevel + MIN_FOREGND_LEVEL;
  }
  ThresholdLevel = ((LTBackGndLevel + (2 * BackGndLevel) +
       (4 * ForeGndLevel)) / 7);
  if (CurrentLevel > ThresholdLevel) {
    ALevelMeasurement = (ushort) 0xFFFF;
  }
  else {
    ALevelMeasurement = 0;
  }
  /* Audio levels are not sent on a 2 way conference */
  if (ConferenceSlotCnt > 2) {
    /* Video State Change so send out message */
    if (PrevVideoState != ReceivingVideo) {
      PrevVideoState = ReceivingVideo;
      ListenCnt = 0;
      PrevAudioLevel = ALevelMeasurement;
      /* Send audio level message */
      SendCPCMsg(vccAudioType, A_LEVEL, 2, 0, ReceivingVideo,
           (uchar *) &ALevelMeasurement);
    }
    /* No Video State Change check for Audio Change */
    else if (PrevAudioLevel != ALevelMeasurement){
      /* Always send Talking transitions, Only send Listening
         transitions after 6 in a row */
      if ((PrevAudioLevel) && (ListenCnt < 6)) {
        ListenCnt++;
      }
      else {
        ListenCnt = 0;
        PrevAudioLevel = ALevelMeasurement;
        /* Send audio level message */
        SendCPCMsg(vccAudioType, A_LEVEL, 2, 0, ReceivingVideo,
             (uchar *) &ALevelMeasurement );
      }
    }
    else ListenCnt = 0;
}
```

What is claimed is:

1. A method for determining a talk/listen state using a dynamic threshold, comprising:

receiving an audio sample representing sound measured during a sample time interval;

generating an audio level from the audio sample, the audio level representing an average power level of the audio sample;

setting a dynamic threshold by processing the audio level to set and maintain a dynamic level and using the dynamic level to determine a value for the dynamic threshold;

comparing the audio level to the dynamic threshold;

determining a talk/listen state to be a talking state if the audio level is above the dynamic threshold and to be a listening state if the audio level is below the dynamic threshold; and repeating the previous steps for each audio sample in a sequential stream of received audio samples such that the dynamic threshold is maintained and used to determine the talk/listen state.

2. The method of claim 1, wherein the method is implemented in a multipoint control unit for a multipoint conference and receiving an audio sample comprises receiving an audio sample from a conference site.

3. The method of claim 1, wherein receiving an audio sample comprises receiving an audio data packet that is part of a data stream including audio and video information.

4. The method of claim 3, wherein receiving the audio data packet comprises receiving an audio data packet representing sound measured over an interval of approximately twenty milliseconds.

5. The method of claim 1 wherein generating an audio level comprises assigning to the average power level a value from zero to a maximum value.

6. The method of claim 5, wherein assigning to the average power level a value comprises assigning a value from zero to 255.

7. The method of claim 1, wherein the dynamic level is a background level, and wherein setting a dynamic threshold comprises processing the audio level to set and maintain the background level and using the background level to determine a value for the dynamic threshold.

8. The method of claim 7, wherein setting a dynamic threshold further comprises processing the audio level to set and maintain a foreground level and using the background level and the foreground level to determine a value for the dynamic threshold.

9. The method of claim 8, wherein setting a dynamic threshold further comprises processing the audio level to set and maintain a long term background level and using the background level, the foreground level and the long term background level to determine a value for the dynamic threshold.

10. The method of claim 9, wherein setting a dynamic threshold comprises setting the dynamic threshold as a weighted sum of the background level, the foreground level and the long term background level.

11. The method of claim 10, wherein setting a dynamic threshold comprises a weighted sum with a ratio of 1:2:4 with respect to the long term background level, the background level and the foreground level.

12. The method of claim 1, wherein the dynamic level is a foreground level, and wherein setting a dynamic threshold comprises processing the audio level to set and maintain the foreground level and using the foreground level to determine a value for the dynamic threshold.

13. The method of claim 1, wherein the dynamic level is a long term background level, and wherein setting a dynamic threshold comprises processing the audio level to set and maintain the long term background level and using the long term background level to determine a value for the dynamic threshold.

14. A method for determining a talk/listen state using a dynamic threshold, comprising:

receiving an audio data packet representing sound measured during a packet time interval;

generating an audio level from the audio data packet, the audio level representing an average power level of the audio data packet;

setting a long term background level;

setting a foreground level by weighting the foreground level with the audio level;

setting a background level by weighting the background level with the audio level;

setting a dynamic threshold equal to a weighted sum of the long term background level, the foreground level and the background level;

comparing the audio level to the dynamic threshold;

determining a talk/listen state to be a talking state if the audio level is above the dynamic threshold and to be a listening state if the audio level is below the dynamic threshold; and repeating the previous steps for each audio data packet in a sequential stream of received audio data packets such that the dynamic threshold and the long term background, background and foreground levels are maintained and used to determine the talk/listen state.

15. The method of claim 14, wherein the method is implemented in a multipoint control unit for a multipoint conference and receiving an audio data packet comprises receiving an audio data packet from conference equipment located at a conference site.

16. The method of claim 14, further comprising signaling a change in the talk/listen state if the talk/listen state is determined to change from listening to talking for a current audio data packet.

17. The method of claim 14, further comprising signaling a change in the talk/listen state if the talk/listen state is determined to change from talking to listening for a plurality of current audio data packets.

18. The method of claim 14, wherein receiving the audio data packet comprises receiving an audio data packet representing sound measured over an interval of approximately twenty milliseconds.

19. The method of claim 14, wherein generating an audio level comprises assigning to the average power level a value from zero to a maximum value.

20. The method of claim 14, wherein setting a dynamic threshold comprises a weighted sum with a ratio of 1:2:4 with respect to the long term background level, the background level and the foreground level.

21. A multipoint control unit, comprising:

a plurality of conference units, each conference unit operable to receive and process each audio sample in a sequential stream of audio samples received from an associated conference site;

each conference unit further operable to set and maintain a dynamic level, to maintain a dynamic threshold using the dynamic level, to compare an audio level of each audio sample to the dynamic threshold and to provide a notification signal indicating a talk/listen state of the associated conference site; and a control unit coupled to the plurality of conference units and receiving each notification signal, the control unit operable to control voice activated switching of video between the associated conference sites using the notification signals.

22. The multipoint control unit of claim 21, wherein each conference unit comprises:
   an audio memory operable to store compressed and expanded audio samples;
   an audio processor coupled to the audio memory, the audio processor operable to expand compressed audio samples received from an associated conference site; and
   a talk/listen determination unit coupled to the audio memory, the talk/listen determination unit operable to access the expanded audio samples in order to process the audio samples.

23. The multipoint control unit of claim 21, wherein the dynamic level is a background level, and wherein each conference unit is further operable to set and maintain the background level and use the background level to determine a value for the dynamic threshold.

24. The multipoint control unit of claim 23, wherein each conference unit is further operable to set and maintain a foreground level and use the background level and the foreground level to determine a value for the dynamic threshold.

25. The multipoint control unit of claim 24, wherein each conference unit is further operable to set and maintain a long term background level and use the background level, the foreground level and the long term background level to determine a value for the dynamic threshold.

26. The multipoint control unit of claim 25, wherein each conference unit is operable to set the dynamic threshold as a weighted sum of the background level, the foreground level and the long term background level.

27. The multipoint control unit of claim 26, wherein the weighted sum is a ratio of 1:2:4 with respect to the long term background level, the background level and the foreground level.

28. The multipoint control unit of claim 21, wherein the dynamic level is a foreground level, and wherein each conference unit is further operable to set and maintain the foreground level and use the foreground level to determine a value for the dynamic threshold.

29. The multipoint control unit of claim 21, wherein the dynamic level is a background level, and wherein each conference unit is further operable to set and maintain the long term background level and use the long term background level to determine a value for the dynamic threshold.

30. A multipoint conference system, comprising:
   a plurality of sets of conference equipment, each set of conference equipment located at a conference site and operable to transmit a sequential stream of audio samples, where each audio sample represents sound measured from the conference site for a sampled interval of time;
   a multipoint control unit coupled to the plurality of sets of conference equipment and receiving each sequential stream of audio samples, the multipoint conference system operable to set and maintain a dynamic level associated with each site, and set a separate dynamic threshold associated with each conference site by processing each dynamic level and audio sample in the sequential stream received from each set of equipment; and
   the multipoint control unit further operable to compare an audio level of each audio sample to the dynamic threshold to determine a talk/listen state of each conference site and to control voice activated switching of video between the conference sites using the determined talk/listen states of the conference sites.

31. The multipoint conference system of claim 30, wherein the dynamic level is a background level, and wherein the multipoint control unit is further operable to set and maintain the background level and use the background level to determine a value for the dynamic threshold.

32. The multipoint conference system of claim 31, wherein the multipoint control unit is further operable to set and maintain a foreground level and use the background level and the foreground level to determine a value for the dynamic threshold.

33. The multipoint conference system of claim 32, wherein the multipoint control unit is further operable to set and maintain a long term background level and use the background level, the foreground level and the long term background level to determine a value for the dynamic threshold.

34. The multipoint conference system of claim 33, wherein the multipoint control unit is operable to set the dynamic threshold as a weighted sum of the background level, the foreground level and the long term background level.

35. The multipoint conference system of claim 34, wherein the weighted sum is a ratio of 1:2:4 with respect to the long term background level, the background level and the foreground level.

36. The multipoint conference system of claim 30, wherein the dynamic level is a foreground level, and wherein the multipoint control unit is further operable to set and maintain the foreground level and use the foreground level to determine a value for the dynamic threshold.

37. The multipoint conference system of claim 30, wherein the dynamic level is a long term background level, and wherein the multipoint control unit is further operable to set and maintain the long term background level and use the long term background level to determine a value for the dynamic threshold.

* * * * *